United States Patent
Yin et al.

(10) Patent No.: US 10,491,071 B2
(45) Date of Patent: Nov. 26, 2019

(54) METHOD OF MANUFACTURING AN ELECTRIC MACHINE WITH A CONFORMAL STATOR COATING

(71) Applicant: General Electric Company, Schenectady, NY (US)

(72) Inventors: Weijun Yin, Schenectady, NY (US); Anil Raj Duggal, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 200 days.

(21) Appl. No.: 15/434,893

(22) Filed: Feb. 16, 2017

(65) Prior Publication Data
US 2018/0233981 A1   Aug. 16, 2018

(51) Int. Cl.
*H02K 3/34* (2006.01)
*H02K 1/04* (2006.01)
(Continued)

(52) U.S. Cl.
CPC ............. *H02K 3/345* (2013.01); *C09D 5/448* (2013.01); *C09D 7/61* (2018.01); *C09D 201/00* (2013.01);
(Continued)

(58) Field of Classification Search
CPC ........ C08K 2201/001; C08K 2201/016; C08K 3/013; C09D 201/00; C09D 5/26; H02K 15/12; H02K 1/04; H02K 3/30
See application file for complete search history.

(56) References Cited

U.S. PATENT DOCUMENTS

| 2,400,576 A |   | 5/1946 | Sigmund et al. |
| 5,632,942 A | * | 5/1997 | Yeh ................... C04B 35/01 |
|             |   |        | 156/89.17 |

(Continued)

FOREIGN PATENT DOCUMENTS

| CN | 1468027 A | 1/2004 |
| CN | 1767322 A | 5/2006 |

(Continued)

OTHER PUBLICATIONS

Espino-Cortes, Fermin P., et al.; "Effectiveness of stress grading coatings on form wound stator coil groundwall insulation under fast rise time pulse", IEEE Transactions on Energy Conversion, vol. 20, Issue: 4, pp. 844-851, Dec. 5, 2005.

(Continued)

*Primary Examiner* — Minh N Trinh
(74) *Attorney, Agent, or Firm* — Fletcher Yoder, P.C.

(57) ABSTRACT

A method of manufacturing an electric machine includes conformally coating a portion of a stator assembly of the electric machine via an electrophoretic process using a coating slurry. The coating slurry includes a polymer precursor loaded with thermally conductive ceramic materials. The method includes curing the polymer precursor of the coated slurry to secure the thermally conductive ceramic materials within a polymer matrix to form a conformal coating on the portion of the stator assembly. The method also includes loading the stator coils into slots of the stator core to form the stator assembly, wherein the conformal coating electrically insolates the stator coils from the stator core of the stator assembly, and wherein an effective amount of thermally conductive ceramic materials, above a percolation threshold, are present in the conformal coating to form continuous thermal pathways across a thickness of the conformal coating.

7 Claims, 6 Drawing Sheets

(51) Int. Cl.
    *H02K 15/12*         (2006.01)
    *H02K 3/30*          (2006.01)
    *C09D 201/00*       (2006.01)
    *C09D 5/44*         (2006.01)
    *C09D 7/61*         (2018.01)
    *C08K 3/013*        (2018.01)
    *C08K 3/22*         (2006.01)
    *C08K 3/28*         (2006.01)
    *C08K 3/38*         (2006.01)

(52) U.S. Cl.
    CPC ................ *H02K 1/04* (2013.01); *H02K 3/30* (2013.01); *H02K 15/12* (2013.01); *C08K 3/013* (2018.01); *C08K 2003/2227* (2013.01); *C08K 2003/282* (2013.01); *C08K 2003/385* (2013.01); *C08K 2201/001* (2013.01); *C08K 2201/016* (2013.01)

(56) References Cited

U.S. PATENT DOCUMENTS

| | | | |
|---|---|---|---|
| 7,337,526 B2 * | 3/2008 | Sweo | ..................... B22C 9/04 164/112 |
| 9,419,489 B2 | 8/2016 | Littlejohn et al. | |
| 10,097,054 B2 * | 10/2018 | Piascik | ................... H02K 1/04 |
| 2013/0069478 A1 | 3/2013 | Hamer | |
| 2013/0183185 A1 * | 7/2013 | Dirscherl | ................ F04C 25/02 418/201.1 |
| 2016/0065024 A1 | 3/2016 | Zhang et al. | |
| 2018/0233981 A1 * | 8/2018 | Yin | ........................ H02K 3/345 |

FOREIGN PATENT DOCUMENTS

| | | |
|---|---|---|
| CN | 101034611 A | 9/2007 |
| CN | 201044196 Y | 4/2008 |
| CN | 201113603 Y | 9/2008 |
| CN | 101857724 A | 10/2010 |
| CN | 202663272 U | 1/2013 |
| CN | 103036328 A | 4/2013 |
| CN | 103178634 A | 6/2013 |
| CN | 104734431 A | 6/2015 |
| CN | 105553136 A | 5/2016 |
| CN | 207640259 U | 7/2018 |
| JP | 5879445 A | 5/1983 |
| RU | 2593600 C1 | 8/2016 |
| RU | 2593601 C1 | 8/2016 |

OTHER PUBLICATIONS

Azizi, Diako, et al.; "Optimization of semiconductive coating and groundwall insulation layers in stator slot of HV generator", International Journal of Electrical Power & Energy Systems, vol. 57, pp. 384-391, 2013.

CN Office Action for Application No. 201810153907.X dated Sep. 4, 2019, pp. 1-12.

* cited by examiner

METHOD OF MANUFACTURING AN ELECTRIC MACHINE WITH A CONFORMAL STATOR COATING

BACKGROUND

The subject matter disclosed herein relates to electric machines, such as electric generators and motors, and more specifically, to improving electrical insulation and heat dissipation of a stator and/or a rotor of an electric machine.

Certain electric machines, such as electric generators and motors, typically employ a combination of a rotor and a stator to convert rotational energy into electrical energy and vice versa. The generator may include slotted cores (e.g., magnetic cores) having electrical conductors (e.g., coil windings) disposed in slots thereof, and the cores or the electrical conductors are electrically insulated from one another to prevent grounding of the conductors to the core. For example, insulation materials, such as polymer films and insulation papers can be used as slot liners and/or ground wall insulation to provide electrical insulation between the coil windings and the slotted core in the electric machine. However, materials with good dielectric properties often exhibit poor thermal conductivity, which hinders the dissipation of heat from the stator and/or rotor. This poor heat dissipation may result in a reduction in power generating efficiency and/or power density, which are key performance parameters of a generator.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an electric machine includes a rotor assembly having a rotor core that extends in an axial direction and a stator assembly surrounding and coaxial with the rotor assembly. The stator assembly includes a stator core having slots extending in a radial direction into an inner surface of the stator core and extending axially from a first end surface to a second end surface of the stator core. The stator assembly includes stator coil windings disposed within the respective slots of the stator core and a first electrically insulating conformal coating disposed between the stator core and the stator coil windings. The conformal coating includes a polymer matrix impregnated with an effective amount of thermally conductive ceramic materials, above a percolation threshold, that form continuous thermal pathways across a thickness of the first coating.

In another embodiment, a method of manufacturing an electric machine includes conformally coating a portion of a stator assembly of the electric machine via an electrophoretic process using a coating slurry, wherein the coating slurry includes a polymer precursor loaded with thermally conductive ceramic materials, and wherein the portion includes a portion of a stator core, stator coils, or a combination thereof. The method includes curing the polymer precursor of the coated slurry to secure the thermally conductive ceramic materials within a polymer matrix to form a conformal coating on the portion of the stator assembly. The method also includes loading the stator coils into slots of the stator core to form the stator assembly, wherein the conformal coating electrically insolates the stator coils from the stator core of the stator assembly, and wherein an effective amount of thermally conductive ceramic materials, above a percolation threshold, are present in the conformal coating to form continuous thermal pathways across a thickness of the conformal coating.

In another embodiment, an electric machine component includes an electrophoretically deposited conformal coating disposed along at least a portion of an outer surface of the component. The conformal coating is electrically insulating and thermally conductive, and includes a polymer matrix impregnated with about 6% to about 60%, by volume, thermally conductive ceramic materials that form continuous thermal pathways within the coating, wherein the amount of the thermally conductive ceramic materials depends at least in part on aspect ratios and/or alignment of the thermally conductive ceramic materials.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
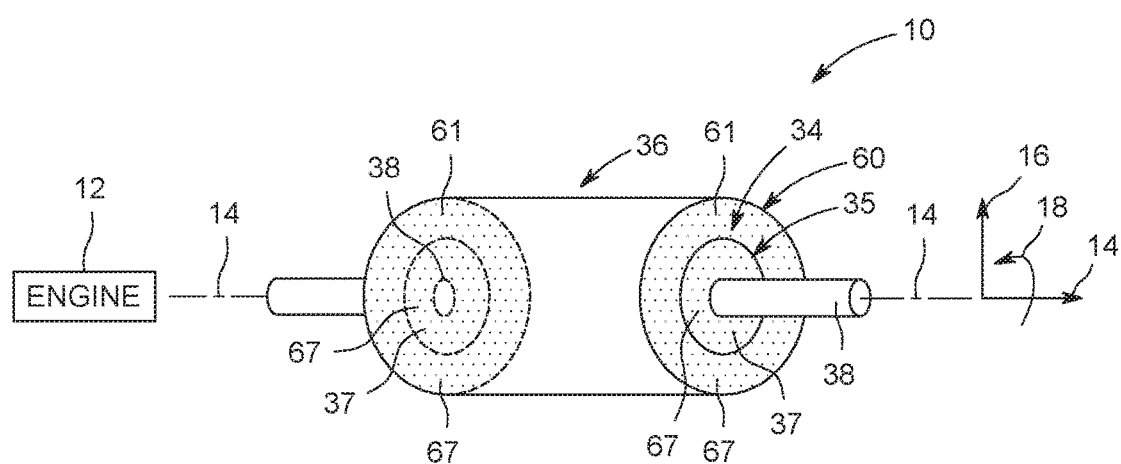
FIG. 1 is a perspective view of an engine, such as an automotive or aircraft engine, coupled to a generator that includes an electrically insulating, thermally conductive conformal coating disposed within, in accordance with embodiments of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In the present context, the term "about" is intended to mean that the values indicated are not exact and the actual value may vary from those indicated in a manner that does not materially alter the operation concerned. For example, the term "about" as used herein is intended to convey a suitable value that is within a particular tolerance (e.g., ±10%, ±5%, ±1%), as would be understood by one skilled in the art.

Insulation materials used in stators and rotors of generators and motors should generally have a low electrical conductivity and a high thermal conductivity. To improve thermal conductivity, thermally conductive ceramic materials, such as boron nitrides and aluminum nitrides may be blended into an electrically insulating polymer matrix, such as epoxy resin, to improve the thermal conductivity of the insulation material. However, such approach requires a significant amount (e.g., higher than about 25% to 45% by volume) of the thermally conductive ceramic materials to be incorporated in the polymer matrix to achieve a reasonable thermal conductivity (e.g., about 1 watt per meter kelvin, W/mK), and the resulting impregnated material is often too viscous material to be used to form polymer composite media (e.g., tapes, papers, films). Further, due to the high viscosity of the impregnated material, voids or gaps are often formed the polymer composite media, resulting in an overall low thermal conductivity. In some approaches, ceramic materials in polymer resin may be applied by powder coating and/or by application techniques, such as brushing, painting, or rolling techniques. In other approaches, pure ceramic coatings having high thermal conductivity and good dielectric strength may be applied by chemical vapor deposition (CVD), thermal spray, or by electrophoretic deposition (EPD). However, these pure ceramic coatings are often treated with high sintering temperatures (e.g., greater than 1000 degrees Celsius) to form substantially void free coatings. Such high sintering temperature may degrade the properties of the coated object (e.g., a stator or a rotor). Furthermore, these coatings often suffer from cracking, especially under thermal cycling, which can allow the windings of a stator or rotor of the electric machine to electrically contact.

With this in mind, present embodiments are directed to an coating material that is both highly thermally conductive and electrically insulating, and that is designed to be conformally deposited onto at least portions of a stator core and/or rotor core of an electric generator or motor to electrically isolate the a stator core and/or rotor core from their respective windings. As will be discussed in greater detail below, the disclosed coating is formed on the stator and/or rotor core via an electrophoretic deposition (EPD) process. The thermal conductivity of the disclosed coating material is achieved by incorporating thermally conductive ceramic materials within a polymer matrix. In particular, the thermally conductive ceramic materials may be uniformly distributed or densely packed to form highly connected thermal conducting paths above a percolation threshold. Voids or gaps between the thermal conducting paths or percolation paths may be significantly reduced or eliminated by co-deposited oligomers and/or monomers that are crosslinked via a post treatment. As such, the disclosed coating material enables the manufacture of electric generators and motors having stators and/or rotors with improved heat dissipation, as well as improved robustness to electrical shorts that tend to form as other types insulating materials degrade as a result of thermal cycling fatigue.

FIG. 1 is a perspective view of an embodiment of an electric machine 10 (e.g., electric generator 10) coupled to an engine 12 (e.g., an engine of an automobile or aircraft). While the illustrated electric machine 10 is an electric generator, it may be appreciated that the techniques discussed herein are applicable to other electric machines, such as electric motors. In the illustrated embodiment, the electric generator 10 may be described relative to an axial direction 14, a radial direction 16, and a circumferential direction or an annular direction 18. The electric generator 10 includes a rotor assembly 34 and a stator assembly 36, which are concentrically aligned about the axial direction 14 of the electric machine 10. The rotor assembly 34 is configured to rotate in the circumferential direction 10 relative to the stator assembly 36. The rotational energy (e.g., the relative rotation between the rotor assembly 34 and the stator assembly 36) is converted to electrical current in armature or power generation coils within the stator or rotor assembly, depending on the design of the generator 10.

The rotor assembly 34 includes a rotor core 35 that has end faces 37. The rotor core 35 is mounted on a shaft 38 such that the rotor core 35 rotates together with the shaft 38. The stator assembly 36 includes a stator core 60 having end faces 61. Further, the rotor assembly 34 and the stator assembly 36 generally both include coil windings, which are illustrated and discussed below with respect to FIGS. 2 and 3. In certain embodiments, the rotor assembly 34 includes field windings that generate a magnetic field, and the stator assembly 36 includes armature or power generation windings that generate electrical power as the rotor assembly 34 rotates. In other embodiments, the stator assembly 36 may include field windings, and rotor assembly 34 may include the armature or power generation windings. As illustrated in FIG. 1 and discussed below, some or all of the end faces 61 of the stator assembly 36, the end faces 37 of the rotor assembly 34, and the windings (e.g., field and/or power generation windings) may be coated with an electrically insulating, thermally conductive conformal coating material 67.

Figure 2:
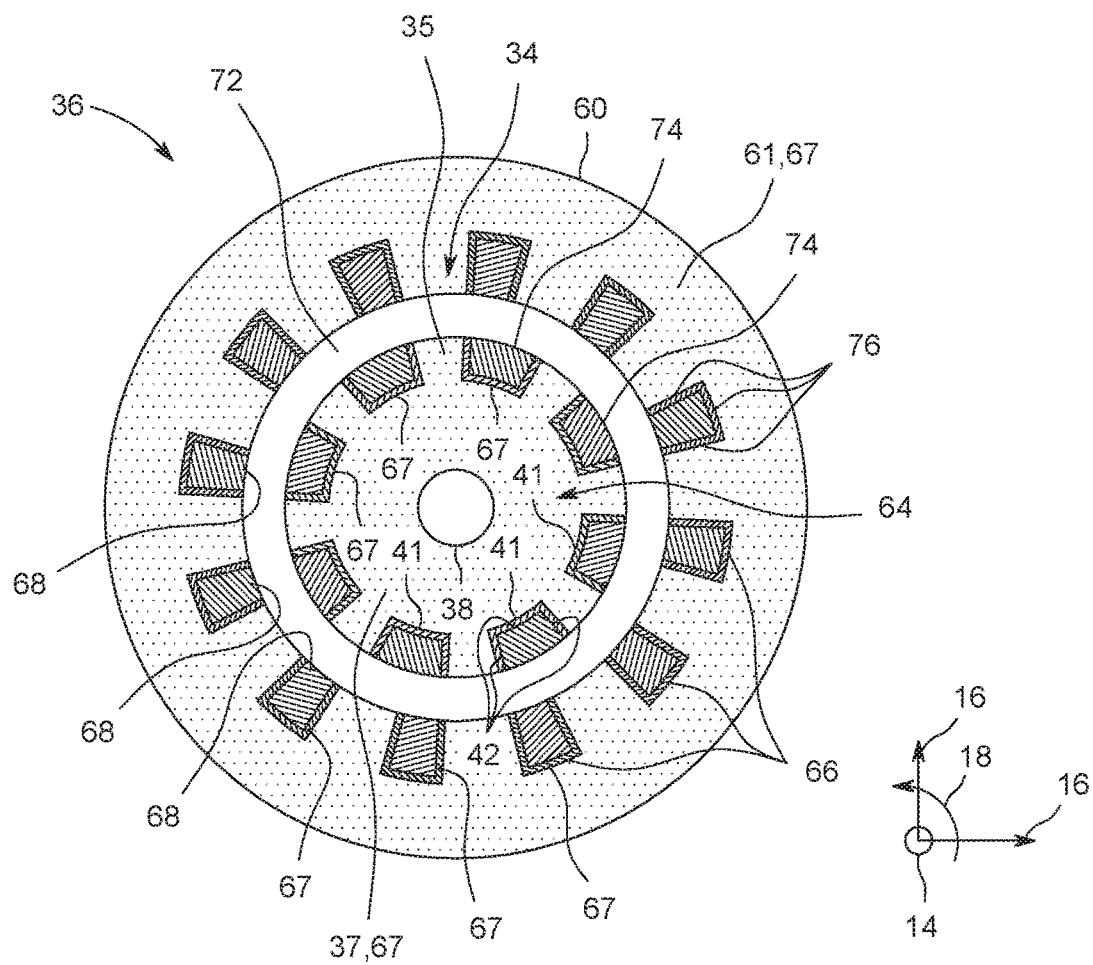
FIG. 2 is a partial front view of the stator assembly and the rotor assembly of the generator illustrated in FIG. 1, in accordance with embodiments of the present disclosure.

FIG. 2 is a front view of the stator assembly 36 and the rotor assembly 34 of the embodiment of the generator 10 illustrated in FIG. 1. The stator assembly 36 may include the stator core 60 having the end faces 61, an axially extending bore 64 (e.g., extending in the axial direction 14), and a plurality of slots or stator slots 66 that extend radially (e.g., in radial directions 16) away from the bore 64, and extend axially (e.g., in the axial direction 14) through the core 60. The stator core 60 may be formed from a series of laminations (e.g., laminated steel) or may take on other suitable forms. The illustrated stator assembly 36 includes stator coils or coil windings 68 having portions extending axially through the slots 66. The rotor assembly 34 is disposed within the bore 64 and extends axially along the bore 64. The illustrated rotor assembly 34 includes the rotor core 35 and a plurality of slots or rotor slots 41 that extend radially (e.g., in radial directions 16) toward the shaft 38, and extend axially (e.g., in the axial direction 14) through the rotor core 35. There may be an air gap 72 between the rotor assembly 34 and the stator core 60. The illustrated rotor assembly 34 includes rotor coils or coil windings 74 having portions extending axially through the slots 41. The rotor coils 74 may be either field coils or power generation coils, depending on arrangement.

Figure 3:
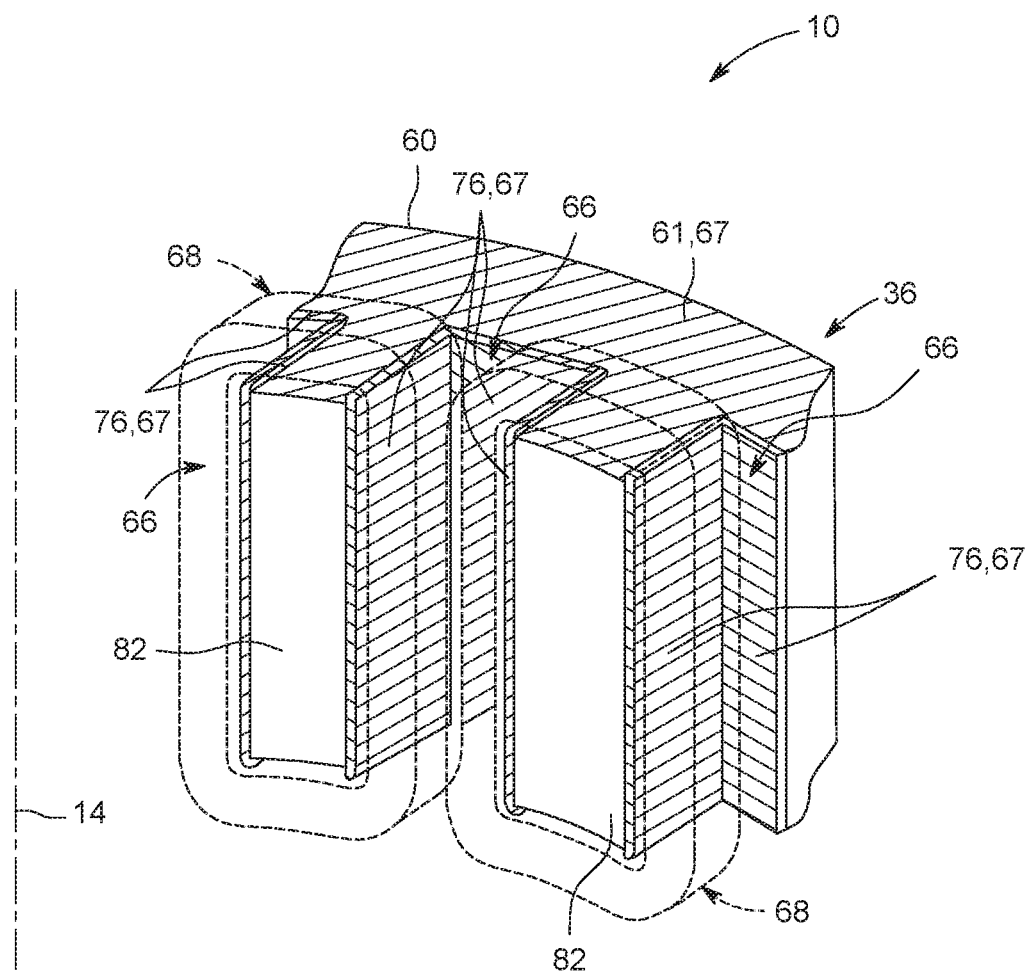
FIG. 3 is a perspective view of a portion of the stator assembly of the generator illustrated in FIGS. 1 and 2, in accordance with embodiments of the present disclosure.

In some embodiment, the disclosed coating material 67 (e.g., highly thermally conductive and electrically insulating material) may be selectively applied (e.g., by EPD) onto portions of the surfaces of the stator core 60 and the rotor core 35, and/or to the surfaces of the windings 68 and 74 before they are loaded into the slots 66 and 41. For example, as illustrated in FIG. 2, the coating material 67 may be generally applied to at least the surfaces 76 of the slots 66 of the stator core 60. In certain embodiments, the coating material 67 may be additionally applied on the end faces 61 of the stator core 60. In certain embodiments, the coating material 67 may be additionally or alternatively applied on the stator coils 68. In certain embodiments, the coating material 67 may be additionally or alternatively applied to the surfaces 42 of the rotor slots 41 of the rotor core 35, the end faces 37 of the rotor core 35, and/or to the rotor coils 74. In certain embodiment, the coating material 67 provides electrical insulation between the rotor coils 74 and the rotor core 35 of the rotor assembly 34 and/or between the stator coils 68 and the stator core 60 of the stator assembly 36, as well as dissipate heat from the rotor assembly 34 and/or from the stator assembly 36. In other embodiments, the stator assembly 36 and/or rotor assembly 34 may additionally include slot liners (as illustrated in FIG. 3) disposed between the stator coils 68 and the coating material 67 of the stator core 60 and/or between the rotor coils 74 and the coating material 67 of the rotor core 35, extending axially through the slots 66 and 41. For such embodiments, these liners may be formed of any suitable electrically insulating materials, such as polymeric films or papers (e.g., Kapton® polyimide films and Nomex® papers, available from DuPont).

FIG. 3 is a perspective view of a portion of the stator core 60 of the embodiment of the electric generator 10 illustrated in FIGS. 1 and 2. Between the adjacent stator slots 66 is a corresponding stator tooth 82. The stator coils 68 (shown in phantom lines) are wound around the stator teeth 82 such that the stator coils 68 extend through the stator slots 66. In certain embodiments, the stator coils 68 may have any other suitable configurations. For example, although two stator coils 68 are shown as extending within each stator slot 66, one or more of the stator slots 66 may include only one stator coil 68 extending therein. As set forth above, the disclosed coating material 67 may be applied to the end faces 61 of the stator core 60, the surfaces 76 within the slots 66, the surfaces of the stator coils 68, or any combination thereof.

Figure 4:
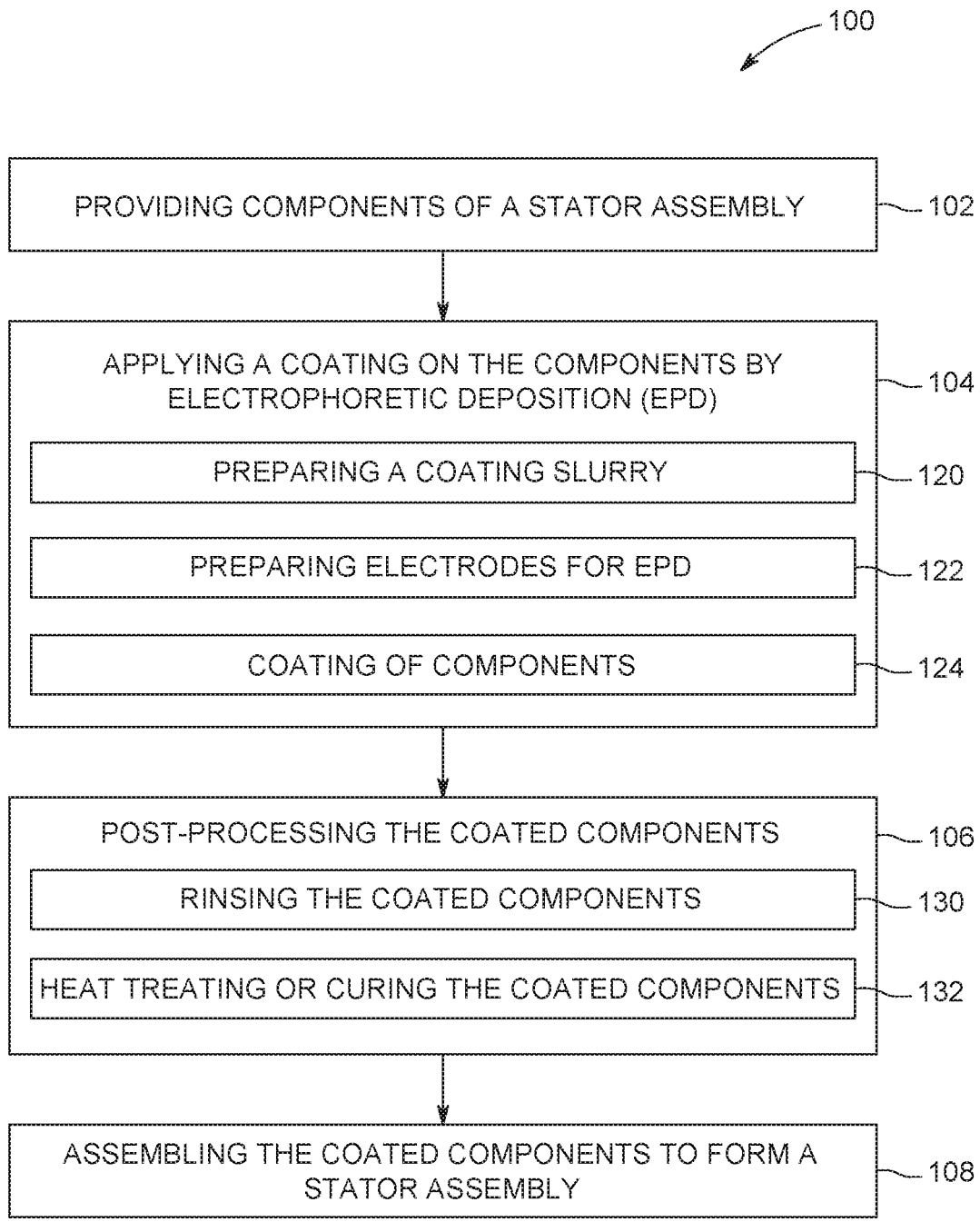
FIG. 4 is a flow chart illustrating a process for fabricating the stator assembly of FIGS. 2 and 3, in accordance with embodiments of the present disclosure.

FIG. 4 is a flow chart illustrating an example of a process 100 for fabricating the stator assembly 36 illustrated in FIGS. 2 and 3, in which having at least a portion of the stator assembly 36 is coated with the disclosed coating material 67 (e.g., highly thermally conductive and electrically insulating material). In the illustrated embodiment, the process 100 generally includes providing components of the stator assembly 36 (block 102), applying an insulation coating to some or all surfaces of one or more of the components by electrophoretic deposition (EPD) (block 104), post-processing the coated components (block 106), and assembling the coated components to form the stator assembly 36 (block 108). As may be appreciated, the same process 100 may be used to form the rotor assembly 34 illustrated in FIGS. 2 and 3, in which having at least a portion of the rotor assembly 34 is coated with the disclosed coating material 67 (e.g., highly thermally conductive and electrically insulating material).

Providing components of a stator assembly (block 102) may include fabricating or obtaining pre-formed components of a stator assembly, such as the stator core 60, the stator coils 68, and/or the liners 70. Alternatively, providing components of a stator assembly (block 102) may include disassembling or removing one or more components (e.g., stator core, stator coils, liners) from an existing or assembled stator assembly during a remanufacturing operation.

The term, "electrophoretic deposition" (EPD), as used herein, may refer to any of electrocoating, cathodic electrodeposition, anodic electrodeposition, electrophoretic coating, or electrophoretic painting. The EPD process may involve submerging the part into a container or vessel that holds a coating slurry, and applying an electrical current through the EPD solution. Typically, the workpiece to be coated serves as one of the electrodes (e.g., anode or cathode), and one or more suitable counter-electrodes are used to complete the circuit. There are two principles types of EPD processes, anodic and cathodic. In the anodic EPD process, negatively charged materials in the coating slurry are deposited on a positively charged workpiece, while in the cathodic process, positively charged materials in the coating slurry are deposited on a negatively charged workpiece. With this in mind, applying the disclosed coating 67 on the components of the stator assembly 36 via EPD, as set forth in block 104, may include one or more of EPD processes, as will be discussed in blocks 120, 122, and 124.

The EPD application process represented by block 104 includes a number of steps, including preparing a coating slurry (block 120), preparing the electrodes for deposition (block 122), and coating the components (124). In certain embodiments, the coating slurry includes a mixture of polymers with ionizable groups, or a colloidal suspension of polymers with ionizable groups, in a suitable solvent along with suspended thermally conductive ceramic materials. The ionizable groups may include any suitable ionizable polymers that are suitable for use in combination with certain thermally conductive ceramic materials. For example, such ionizable polymers may include, but are not limited to, liquid crystal polymer, thermal plastics, and/or organic monomers or oligomers. The liquid crystal polymers, such as liquid crystal polyester, liquid crystal epoxy, and polyetheretherketon, generally have a higher thermal conductivity than other polymers, which enhances heat dissipation in the disclosed coating 67. The thermally conductive ceramic materials may include aluminum nitride, boron nitride, diamond, aluminum oxide, and other suitable electrically insulating, thermally conductive materials. The thermally conductive ceramic materials may be in any suitable forms, such as particles, nanotubes (e.g., nanotubes of single and/or multiple walls, nanotubes of different chirality), nanofibers, nanowires, nanowhiskers, irregular shapes, etc. The sizes (e.g., diameter, length, width, characteristic length, aspect ratio) of the thermally conductive ceramic materials may also be in any suitable range, from nanometer range to micrometer range. For example, the thermally conductive ceramic materials may include or consist of particles having an aspect ratio (e.g., length:width) greater than about 500:1, about 400:1, about 300:1, about 200:1, about 100:1, about 50:1. By particular example, in certain embodiments, the thermally conductive ceramic materials may include boron nitride nanotubes having an aspect ratio of about 500:1. For example, the thermally conductive ceramic materials may include or consist of particles having an aspect ratio less than about 500:1, about 400:1, about 300:1, about 200:1, about 100:1, about 50:1. For example, the thermally conduct ceramic materials may include or consist of particles having an high aspect ratio in combination with particles having a low aspect ratio or an aspect ratio substantially equals to 1:1. As may be appreciated, the ionized groups (e.g., liquid crystal polymer, thermal plastics, and/or organic monomers or oligomers) and the thermally conductive ceramic materials to be coated on the same electrode (e.g., the object to be coated) be similarly charge (i.e., either both positively charged or both negatively charged). In addition, the coating slurry may also include additives and surfactants to improve the EPD process and/or the coating quality.

The size and/or the concentration (e.g., volume percentage) of the ceramic materials in the coating slurry may be tuned to increase the thermal conductivity of the disclosed coating material 67 and/or control the morphology of the coating. Further, the stability of the colloid solution containing the desired polymers and ceramic materials may be modified by changing the colloidal chemistry to form a stable insulation coating and/or to improve the morphology of the insulation coating. For example, parameters, such as pH (e.g., potential of hydrogen) level and/or zeta potential (e.g., electrokinetic potential in colloidal dispersions) may be modified to change the charging behavior of the ionized groups to form a stable insulation coating. For example, suitable solvent, surfactants, and/or additives may be used to form a stable insulation coating. For example, the viscosity of the coating slurry may be modified to form a stable insulation coating and/or to improve the morphology of the insulation coating.

Depending on the chemistry of the coating material 67, preparing the electrodes for EPD (block 122) may submerging the components to be coated as one of the electrodes (e.g., anode or cathode) in the coating slurry, and submerging a counter electrode to set up a complete electrical circuit. The components to be coated may include the stator core 60, the stator coils 68, and/or any other suitable components of the stator assembly 36. In certain embodiments, the preparation of block 122 may include applying one or more masks (e.g., masking tape) on the components to be coated before submerging the components to be coated into the coating slurry. For example, before submerging the stator core 60 into the coating slurry, if only the end faces 61 and/or the surfaces 76 with the stator slots 66 are to be coated, one or more masks may be applied to the stator core 60 to cover other surfaces that are not to be coated, such that these surfaces are not in contact with the coating slurry. As may be appreciated, a conformal and uniform coating may be achieved by suitable design of the deposition electrode geometry to control the electrical field for complex geometry deposition (e.g., slots 66 of the stator core 60). In certain embodiments, the preparation of block 122 may also include any suitable cleaning processes to clean the components to be coated or applying a suitable pre-coating, such as a conversion coating, to the components to be coated.

The coating process indicated by block 124 generally includes applying direct electrical current through the EPD coating slurry using the electrodes. Parameters that affect the EPD process can be controlled to achieve desired qualities for the insulation coating. These parameters may include, for example, applied voltage, coating temperature, coating time, coating or deposition rate, etc. These parameters may affect the deposition kinetics to change the quality or characteristics of the insulation coating (e.g., thickness, morphology, uniformity, surface coverage, etc.). In certain embodiments, these parameters may be tuned to align the liquid crystal polymers in the slurry. In certain embodiments, these parameters may be tuned to align the thermally conductive ceramic materials in the slurry. For example, the thermally conductive ceramic material having a high aspect ratio (e.g., nanowire, nanotube, nanofiber) may be aligned such that the axial direction (e.g., along the length) of the thermally conductive ceramic particles are aligned substantially perpendicular to the surface of the coated components. The desired qualities and/or characteristics of the insulation coating will be discussed in greater detail below with respect to FIG. 5.

Post-processing the coated components (block 106) generally includes rinsing and heat treating the components. After deposition, the coated components are rinsed to remove excess coating slurry from the components (block 130). In certain embodiments, if one or more masks (e.g., masking tape) were applied to the coated components, the masks are removed after the EPD deposition. Subsequently, a heat treatment or other suitable curing process is applied to the coated components (block 132). For example, a heat treating or curing process may crosslink the deposited polymers and facilitate a smooth, continuous, and less porous insulation coating. In particular, the process 132 may include suitable treatments by heat, ultraviolet (UV) light, infrared (IR) light, and/or electron beam energy to crosslink the deposited polymer precursors to form a continuous, conformal coating on the components. Additionally, heat treatment or curing process may substantially reduce or eliminate the gaps, voids, and/or factures in the as-deposited coating.

Upon completion of the post-processing indicated in block 106, the coated components can be assembled to form the stator assembly 36 (block 108). For example, the process 108 may include loading stator coils 68 into the slots 66, wherein one or both are coated with the coating material 67. It may be appreciated that although the process 100 is given as an example for fabricating the stator assembly 36, the process 100 may also be used to fabricate a rotor assembly 34 having at least a portion of the rotor core 35 coated by the disclosed coating. For example, as illustrated in FIG. 3, the rotor core 35 and/or rotor coils or coil windings 74 of the rotor assembly 34, or both, may be coated using the process illustrated in FIG. 4.

The coating material 67 deposited on the one or more components of the stator assembly 36 and/or the rotor assembly 34 via the EPD process may have qualities and/or characteristics. For example, the coating material 67 is substantially continuous and substantially uniform (e.g., uniform in terms of composition, thickness, etc.). The dielectric breakdown strength of the coating material 67 may be affected by the coating thickness and/or uniformity, which may be controlled by the deposition kinetics and deposition rate. In particular, the dielectric breakdown strength may increase by increasing the coating thickness and/or uniformity. In certain embodiments, the insulation coating may have a thickness in a range of about 0.25 millimeters (mm) to about 0.5 mm. In certain embodiments, the insulation coating may have a thickness in a range of about 0.025 mm to about 0.25 mm. In certain embodiments, the insulation coating may have a thickness in a range of about 0.025 millimeters (mm) to about 0.5 mm.

The disclosed coating 67 is substantially conformal, meaning it is continuous and conforms to the contours (e.g., surface features, including troughs, channels, edges, corners, and surface irregularities) of the coated object. Further, the coating material 67 is substantially free of voids and cracks. As set forth above, these morphological characteristics, as well as the thickness of the insulation coating, are controlled by modifying the parameters of EPD process (e.g., blocks 104 and 106). Indeed, it is presently recognized that gaps, voids, and cracks can be avoided by co-depositing oligomers or monomers followed by curing to form a continuous insulation coating, even for relatively thick coatings, in accordance with the present approach.

In addition, the coating material 67 includes a substantial amount of the thermally conductive ceramic materials, such as aluminum nitride, boron nitride, aluminum oxide, or a combination thereof. In certain embodiments, the concentration of the thermally conductive ceramic materials may be greater than about 60% by volume. In certain embodiments, the concentration of the thermally conductive ceramic materials may be between about 30% and about 60% by volume. In certain embodiments, the concentration of the thermally conductive ceramic materials having a high aspect ratio (e.g., nanowire, nanotube, nanofiber) may be less than about 30% by volume. In certain embodiments, the concentration of the thermally conductive ceramic materials having a high aspect ratio (e.g., nanowire, nanotube, nanofiber) and/or have good alignment may be less than about 6% by volume. For example, as set forth above, the EPD deposition may enable alignment of high-aspect ratio, thermally conductive ceramic materials and such alignment may facilitate more effective formation of thermal conducting paths, as will be discussed in greater detail in FIG. 6. In certain embodiments, the thermal conductivity of the insulation coating may be greater than about 3 W/mK. The high thermal conductivity may be achieved based at least in part on the distribution, packing, and/or content of the thermally conductive ceramic materials within the coating material 67. In particular, the thermally conductive ceramic materials may have a long-range connectivity that forms long-range thermal conducting paths above a percolation threshold to ensure that the thermal conductivity of the coating 67 is substantially high.

Figure 5:
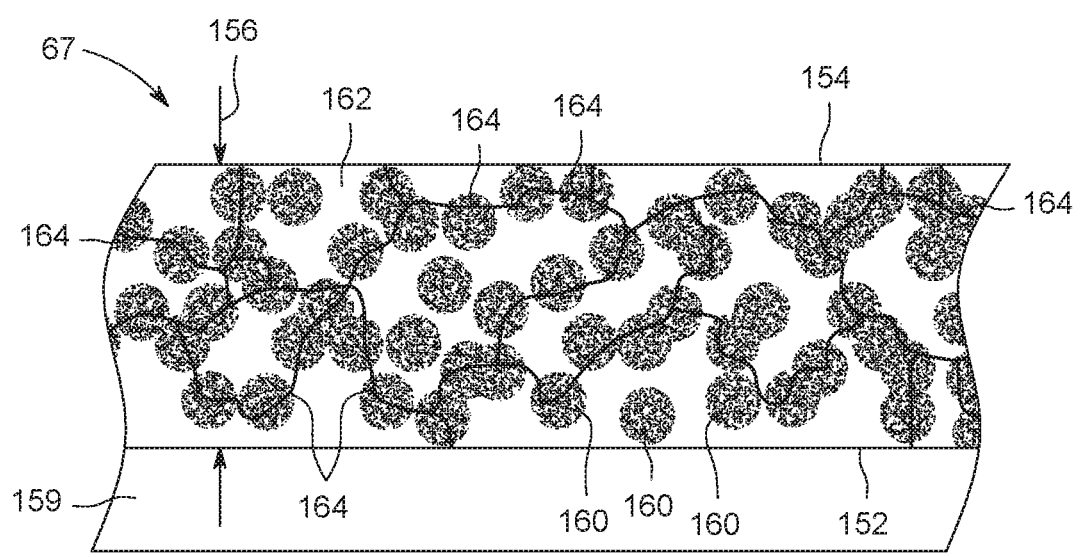
FIG. 5 is a schematic illustrating an embodiment of the electrically insulating, thermally conductive conformal coating having thermal conducting paths above a percolation threshold.

By way of a non-limiting example, FIG. 5 shows a schematic illustrating an insulation coating having thermal conducting paths above the percolation threshold. It should be noted that while the concept of percolation threshold is discussed in a two-dimensional illustration in FIG. 5, the same concept is applicable in a three-dimensional space. In the illustrated embodiment, the coating material 67 forms a conformal and continuous coating on the surface 159 of the coated component. The illustrated portion of the coating material 67 may be described extending between a first edge 152 (i.e., nearest the surface 159 of the coated component) and a second edge 154 opposite to the first edge 152 of the coating material 67, and extending laterally along the surface 159 of the coated component.

As discussed above, the coating material or coating 67 includes thermally conductive ceramic materials may be in the form of particles 160 (e.g., aluminum nitride particles, boron nitride particles, aluminum oxide particles, diamond particles, or a combination thereof) dispersed in a polymer matrix 162 (e.g., liquid crystal polymer, thermal plastics, organic monomers or oligomers, or a combination thereof). As illustrated, the thermally conductive ceramic particles 160 are packed adjacent to one another at sufficient concentration to form long-range thermal pathways or percolation paths 164 that extends between edges 152 and 154, across the thickness 156 of the coating 67. Additionally, in certain embodiments, these percolation paths 164 may also run laterally through the coating material 67. It is presently recognized that, in general, these percolation paths 164 enable the coating 67 to maintain a thermal conductivity close to that of the thermally conductive ceramic particles 160 themselves, while the polymer matrix ensures the integrity of the coating 67. The packing and/or the percolation paths 164 of the thermally conductive ceramic particles 160 may be tuned by changing the particle size, distribution, and/or concentration (e.g., concentration in the coating slurry) to achieve thermal conductivity greater than 3 W/mK.

Figure 6:
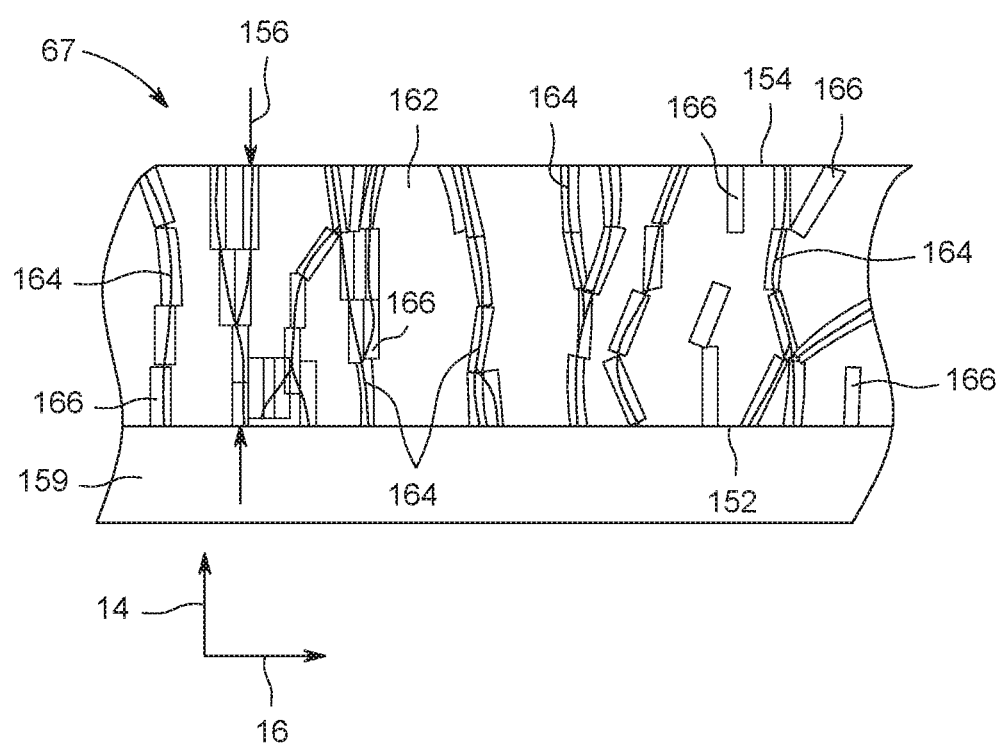
FIG. 6 is a schematic illustrating an embodiment of the electrically insulating, thermally conductive conformal coating having thermal conducting paths above a percolation threshold.

As another non-limiting example, the thermally conductive ceramic materials may also be in the form of an electrically nonconductive nanotube, nanofiber, or nanowire, having a high aspect ratio (e.g., greater than about 500:1, about 400:1, about 300:1, about 200:1, about 100:1, about 50:1). FIG. 6 shows a schematic illustrating an embodiment of the disclosed coating 67 having a sufficient amount of high-aspect thermally conductive ceramic materials, above a percolation threshold, such that continuous thermally conducting pathways are formed across the thickness of the coating 67. It should be noted that the only difference between FIG. 5 and FIG. 6 is that the thermally conductive ceramic materials illustrated in FIG. 6 have a high aspect ratio. For example, the coating material 67 includes thermally conductive ceramic nanotubes 166 (e.g., aluminum nitride nanotubes, boron nitride nanotubes, aluminum oxide nanotubes, or a combination thereof) dispersed in the polymer matrix 162 (e.g., liquid crystal polymer, thermal plastics, organic monomers or oligomers, or a combination thereof). For the illustrated portion of the coating material 67, the thermally conductive ceramic nanotubes 166 are aligned in a direction (e.g., axial direction 14) that is substantially perpendicular to a direction (e.g., radial direction 16) of the surface 159. Due to the alignment of the thermally conductive ceramic nanotubes 166, the percolation paths 164 may be formed more effectively extending between the edges 152 and 154, across the thickness 156 of the coating 67. Consequently, if the same polymer matrix 162 and the thermally conductive ceramic material (e.g., boron nitride) are used, the effective concentration or loading of the high-aspect particles (e.g., nanotubes 166, as illustrated in FIG. 6) may be lower than that of low-aspect ratio particles (e.g., spherical particles 160, as shown in FIG. 5) to achieve a similar thermal conductivity in the two coatings 67. In certain embodiments, the effective concentration of the high-aspect articles may be between about 6% and about 60% by volume. It may be appreciated that the amount of the thermally conductive ceramic materials incorporated in the coating 67 may depend at least in part of the aspect ratios and/or the alignment of the thermally conductive ceramic materials.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of manufacturing an electric machine, comprising:
   providing a stator assembly of the electric machine;
   conformally coating a portion of the stator assembly of the electric machine via an electrophoretic process using a coating slurry, wherein the coating slurry includes a polymer precursor loaded with thermally conductive ceramic materials, and wherein the portion of the stator assembly includes a portion of a stator core, stator coils, or a combination thereof;
   curing the polymer precursor of the coated slurry to secure the thermally conductive ceramic materials within a polymer matrix to form a conformal coating on the portion of the stator assembly; and loading the stator coils into slots of the stator core to form the stator assembly, wherein the conformal coating electrically insolates the stator coils from the stator core of the stator assembly, and wherein an effective amount of thermally conductive ceramic materials, above a percolation threshold, are present in the conformal coating to form continuous thermal pathways across a thickness of the conformal coating.

2. The method of claim 1, further comprising:

providing a rotor assembly of the electric machine;

conformally coating a portion of the rotor assembly of the electric machine via an electrophoretic process with the coating material, wherein the portion includes a portion of the rotor assembly of a rotor core, rotor coils, or a combination thereof;

curing the polymer precursor of the coating material to secure the thermally conductive ceramic materials within a polymer matrix to form a second conformal coating on the portion of the rotor assembly; and loading the rotor coils into slots of the rotor core to form the rotor assembly, wherein the second conformal coating electrically insolates the rotor coils from the rotor core of the rotor assembly, and wherein an effective amount of thermally conductive ceramic materials, above a percolation threshold, are present in the second conformal coating to form continuous thermal pathways across a thickness of the second conformal coating.

3. The method of claim 2, comprising combining the stator assembly and the rotor assembly to form a generator or motor.

4. The method of claim 2, wherein the portion of the stator assembly comprises the slots, first and second end surfaces of the stator core, or a combination thereof.

5. The method of claim 2, wherein the portion of the stator assembly comprises the coil windings.

6. The method of claim 2, wherein the conformal coating has a thickness between about 0.025 millimeters (mm) and 0.5 mm and is substantially free of voids or cracks after the curing.

7. The method of claim 2, comprising forming the coating slurry by mixing from about 6% to 60% of the thermally conductive ceramic materials, by volume, into the polymer precursor, wherein the thermally conductive ceramic materials comprise aluminum nitride, boron nitride, aluminum oxide, diamond, or a combination thereof, and the polymer matrix comprises liquid crystal polymers, thermoplastic polymers, organic monomers or oligomers, or a combination thereof, wherein a mixed amount of the thermally conductive ceramic materials depends at least in part on aspect ratios and/or alignment of the thermally conductive materials.

* * * * *